(12) United States Patent
Booker et al.

(10) Patent No.: US 7,982,633 B2
(45) Date of Patent: Jul. 19, 2011

(54) DATA COMMUNICATION AND POWER SUPPLY SYSTEM FOR DOWNHOLE APPLICATIONS

(75) Inventors: John Booker, Aberdeen (GB); John Freer, Aberdeen (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 879 days.

(21) Appl. No.: 11/570,688

(22) PCT Filed: May 26, 2005

(86) PCT No.: PCT/GB2005/002100
§ 371 (c)(1),
(2), (4) Date: Dec. 15, 2006

(87) PCT Pub. No.: WO2006/003359
PCT Pub. Date: Jan. 12, 2006

(65) Prior Publication Data
US 2008/0272932 A1 Nov. 6, 2008

(30) Foreign Application Priority Data

Jul. 5, 2004 (GB) .................................. 0415002.5

(51) Int. Cl.
*G01V 3/00* (2006.01)
(52) U.S. Cl. ............... 340/854.9; 340/853.3; 340/855.8; 340/855.9
(58) Field of Classification Search ............... 340/855.8, 340/855.9, 854.8, 853.3
See application file for complete search history.

(56) References Cited

U.S. PATENT DOCUMENTS

| | | | |
|---|---|---|---|
| 3,284,669 A | 11/1966 | Boyd | |
| 3,340,500 A | 9/1967 | Boyd et al. | |
| 4,157,535 A | 6/1979 | Balkanli | |
| 4,178,579 A | 12/1979 | McGibbeny et al. | |
| 4,365,506 A * | 12/1982 | Hyde | 73/152.61 |
| 4,581,613 A * | 4/1986 | Ward et al. | 340/855.9 |
| 4,631,536 A | 12/1986 | Ward et al. | |
| 4,788,545 A | 11/1988 | Farque | |
| 5,515,038 A | 5/1996 | Smith | |
| 5,539,375 A * | 7/1996 | Atherton | 340/538.11 |
| 5,670,931 A | 9/1997 | Besser et al. | |
| 5,713,415 A * | 2/1998 | Bridges | 166/60 |

(Continued)

FOREIGN PATENT DOCUMENTS

EP 1197011 B1 8/2004

(Continued)

*Primary Examiner* — Timothy Edwards, Jr.
(74) *Attorney, Agent, or Firm* — Osha Liang LLP; Kevin B. McGoff; Rodney V. Warfford

(57) ABSTRACT

A data communication system for use in downhole applications wherein electrical energy is supplied over a multiple-conductor power cable to an ESP motor assembly. A downhole unit is AC-coupled to the conductors of the power cable through the wye point of the ESP motor assembly. A surface unit is AC-coupled to the conductors of the power cable. Uplink communication of telemetry data occurs over an AC communication scheme supported by the downhole unit and the surface unit. Downlink communication of remote control command data occurs over a different AC communication scheme supported by the surface unit and the downhole unit. These AC communication schemes provide an independent supply of power to the downhole environment. All communication between the surface and downhole environment is accomplished through the power cable without the use of additional communication lines. Data communication is maintained in the event of a ground fault on the power cable.

30 Claims, 5 Drawing Sheets

U.S. PATENT DOCUMENTS

| | | |
|---|---|---|
| 5,870,016 A | 2/1999 | Shrestha |
| 5,930,099 A * | 7/1999 | Legro et al. .................. 361/112 |
| 6,176,308 B1 * | 1/2001 | Pearson ....................... 166/65.1 |
| 6,396,415 B1 | 5/2002 | Bulmer |
| 6,587,037 B1 | 7/2003 | Besser et al. |
| 6,798,338 B1 * | 9/2004 | Layton ...................... 340/854.6 |
| 7,686,074 B2 * | 3/2010 | McCoy et al. ............... 166/66.4 |
| 2002/0121987 A1 * | 9/2002 | Besser et al. ............... 340/854.9 |
| 2004/0246108 A1 * | 12/2004 | Robertson et al. ....... 340/310.01 |
| 2006/0102341 A1 * | 5/2006 | Freer et al. ............... 166/250.01 |

FOREIGN PATENT DOCUMENTS

| | | |
|---|---|---|
| GB | 2369759 A | 6/2002 |
| RU | 2131514 C2 | 6/1999 |
| RU | 2230187 C2 | 4/2004 |
| SU | 128764 A1 | 1/1960 |
| WO | WO2002/051025 A1 | 6/2002 |
| WO | WO2004/028064 A3 | 4/2004 |

* cited by examiner

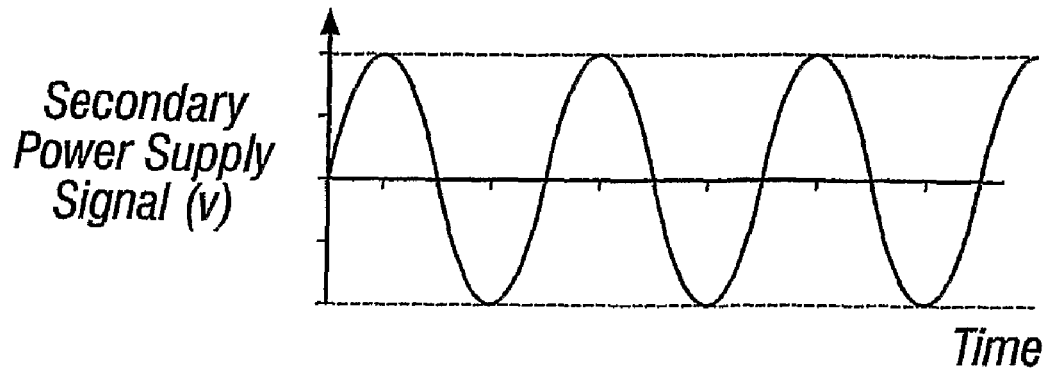
FIG. 2A(i)
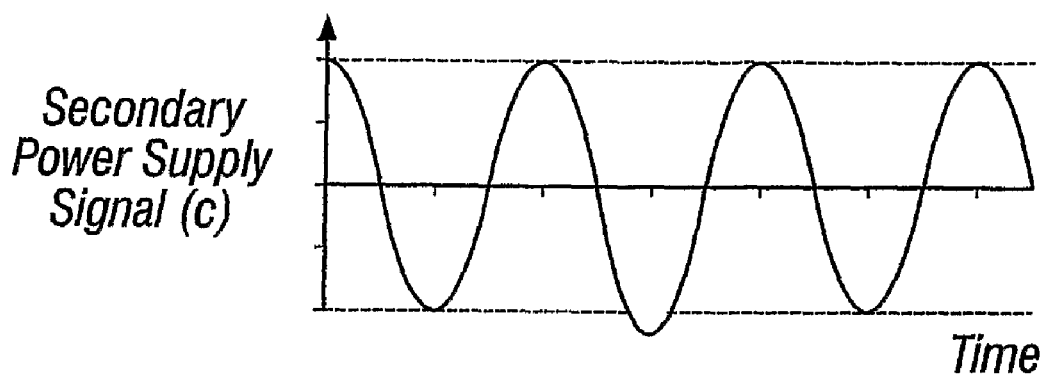
FIG. 2A(ii)
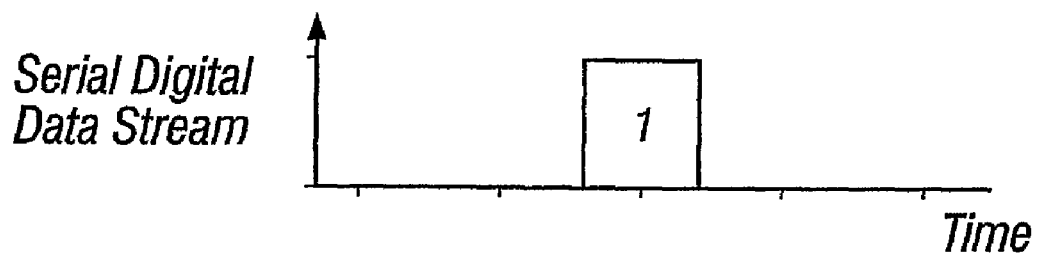
FIG. 2A(iii)

FIG. 2B(ii)

FIG. 2B(iii)

DATA COMMUNICATION AND POWER SUPPLY SYSTEM FOR DOWNHOLE APPLICATIONS

BACKGROUND OF THE INVENTION

1. Field of the Invention

This invention relates broadly to data communication systems for downhole devices. More particularly, this invention relates to data communication systems over a power cable to an electrical submersible pump (ESP).

2. Description of Related Art

Various communication systems for telemetry signals that represent physical parameters measured by sensors within a borehole have been proposed and/or utilized. Several such systems employ the three-phase power cable (which transmits power to the ESP) for transmission of such telemetry signals.

An example of such a system is shown in U.S. Pat. No. 5,515,038. In this system, direct current (DC) offsets to the alternating current (AC) power signal carried on the cable are used to carry the telemetry data.

Disadvantageously, such communication systems cannot tolerate a ground fault, for example, where one conductor of the power cable is shorted to ground. Moreover, such systems typically employ large isolation chokes on the surface and in the downhole environment, which limit the data transfer rates of the system, and also fail to operate in noisy environments.

In another system shown in U.S. Pat. No. 6,587,037, phase-to-phase signaling is used to carry the telemetry data over the conductors of the power cable. Disadvantageously, the communication requires access to all three conductors in the downhole environment, which is difficult and expensive to implement and maintain.

Thus, there is a need in the art to provide a communication system for downhole devices that is tolerant to ground faults and is also cost-effective. Moreover, the communication system should advantageously avoid the use of large isolation chokes, provide relatively high data transfer rates, provide two-way communication, and also operate efficiently in noisy environments.

BRIEF SUMMARY OF THE INVENTION

It is therefore an object of the invention to provide a communication system for downhole devices that is tolerant to ground faults and is also cost-effective.

It is another object of the invention to provide a communication system for downhole devices that avoids the use of large isolation chokes.

It is a further object of the invention to provide a communication system for downhole devices that provides relatively high data transfer rates.

It is also an object of the invention to provide a communication system for downhole devices that is capable of efficient operation in noisy environments.

In accord with these objects, which will be discussed in detail below, an improved communication system is provided for use in downhole applications wherein electrical energy is supplied over a multiple conductor power cable to an ESP motor assembly. A downhole unit is AC-coupled to the multiple conductor power cable through the wye point of the ESP motor assembly. A surface unit is AC-coupled to the multiple conductor power cable. Uplink communication of telemetry data occurs over an AC communication scheme supported by the downhole unit and the surface unit. Downlink communication of command data (for remote control purposes) occurs over a different AC communication scheme supported by the surface unit and the downhole unit. These AC communication schemes provide an independent supply of power to the downhole unit.

It will be appreciated that all communication between the surface and downhole is accomplished through the power cable without the use of additional communication lines, and communication is maintained in the event of a ground fault on the power cable.

According to one embodiment of the invention, the AC communication scheme supporting uplink communication employs current modulation of a power supply carrier signal independent of the ESP power supply.

According to another embodiment of the invention, the AC communication scheme supporting downlink communication employs frequency modulation of a power supply carrier signal independent of the ESP power supply.

Additional objects and advantages of the invention will become apparent to those skilled in the art upon reference to the detailed description taken in conjunction with the provided figures.

BRIEF DESCRIPTION OF THE DRAWINGS

FIGS. 2A(*i*)-(*iii*) illustrate signals utilized for uplink communication from the downhole unit to the surface unit of FIG. 1, wherein the frequency of the secondary power supply carrier is less than that shown in FIGS. 2B(*i*)-(*iii*); FIG. 2A(*i*) is a representation of a voltage waveform of the secondary power supply signal generated at the surface unit of FIG. 1A; FIG. 2A(*ii*) is a representation of a current waveform of the secondary power supply signal generated at the surface unit of FIG. 1A in addition to current modulations superimposed onto this waveform by the downhole unit of FIGS. 1A and 1B; and FIG. 2A(*iii*) depicts a serial digital data stream that is represented by the current modulations shown in FIG. 2A(*ii*).

FIG. 2B(*i*) is a representation of a voltage waveform of the secondary power supply signal generated at the surface unit of FIG. 1A; FIG. 2B(*ii*) is a representation of a current waveform of the secondary power supply signal generated at the surface unit of FIG. 1A in addition to current modulations superimposed onto this waveform by the downhole unit of FIGS. 1A and 1B; and FIG. 2B(*iii*) depicts a serial digital data stream that is represented by the current modulations shown in FIG. 2B(*ii*).

DETAILED DESCRIPTION OF THE INVENTION

Figure 1A:
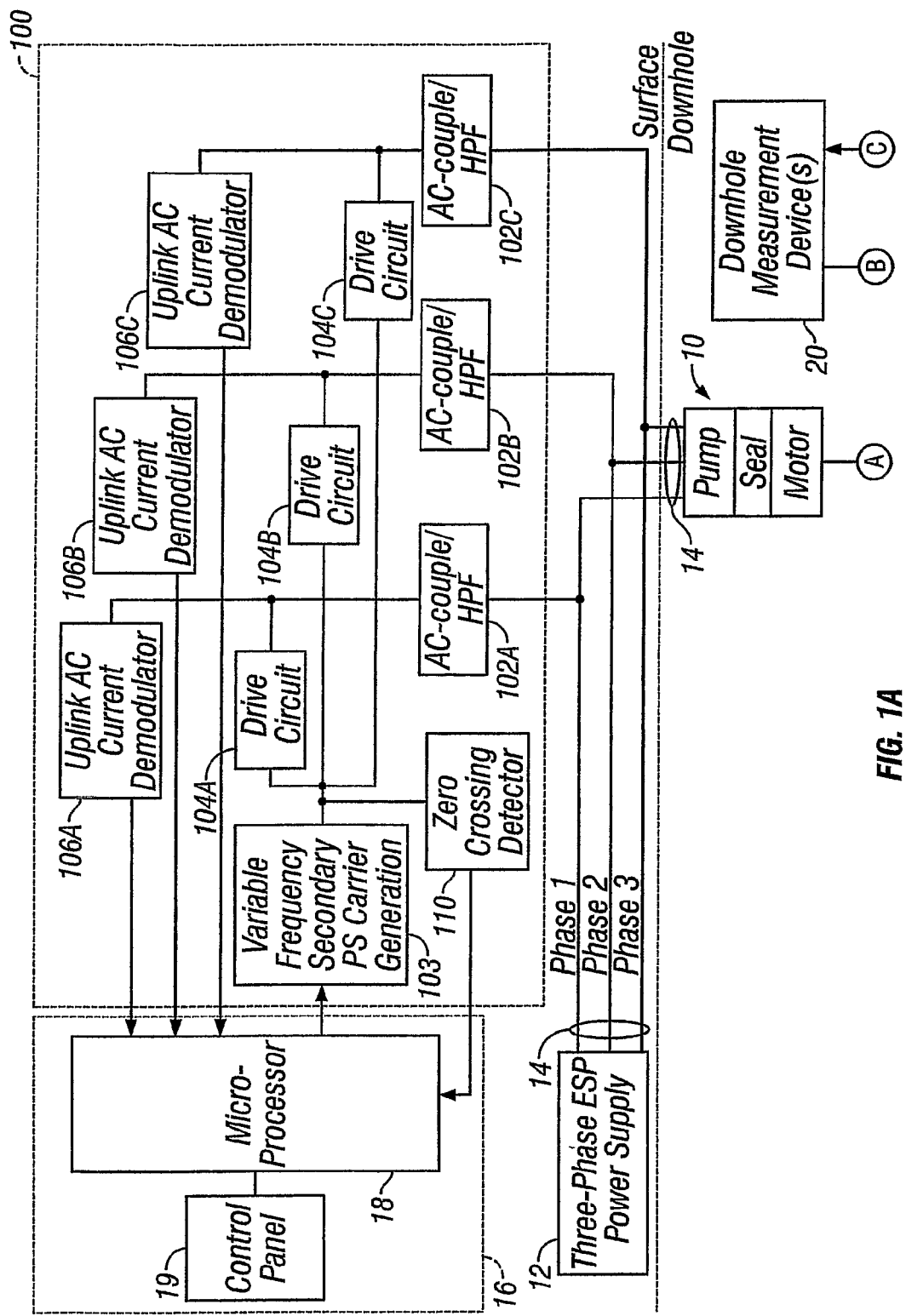
FIGS. 1A and 1B are a functional block diagram of a communication system for use in subterranean borehole applications.
Figure 1B:
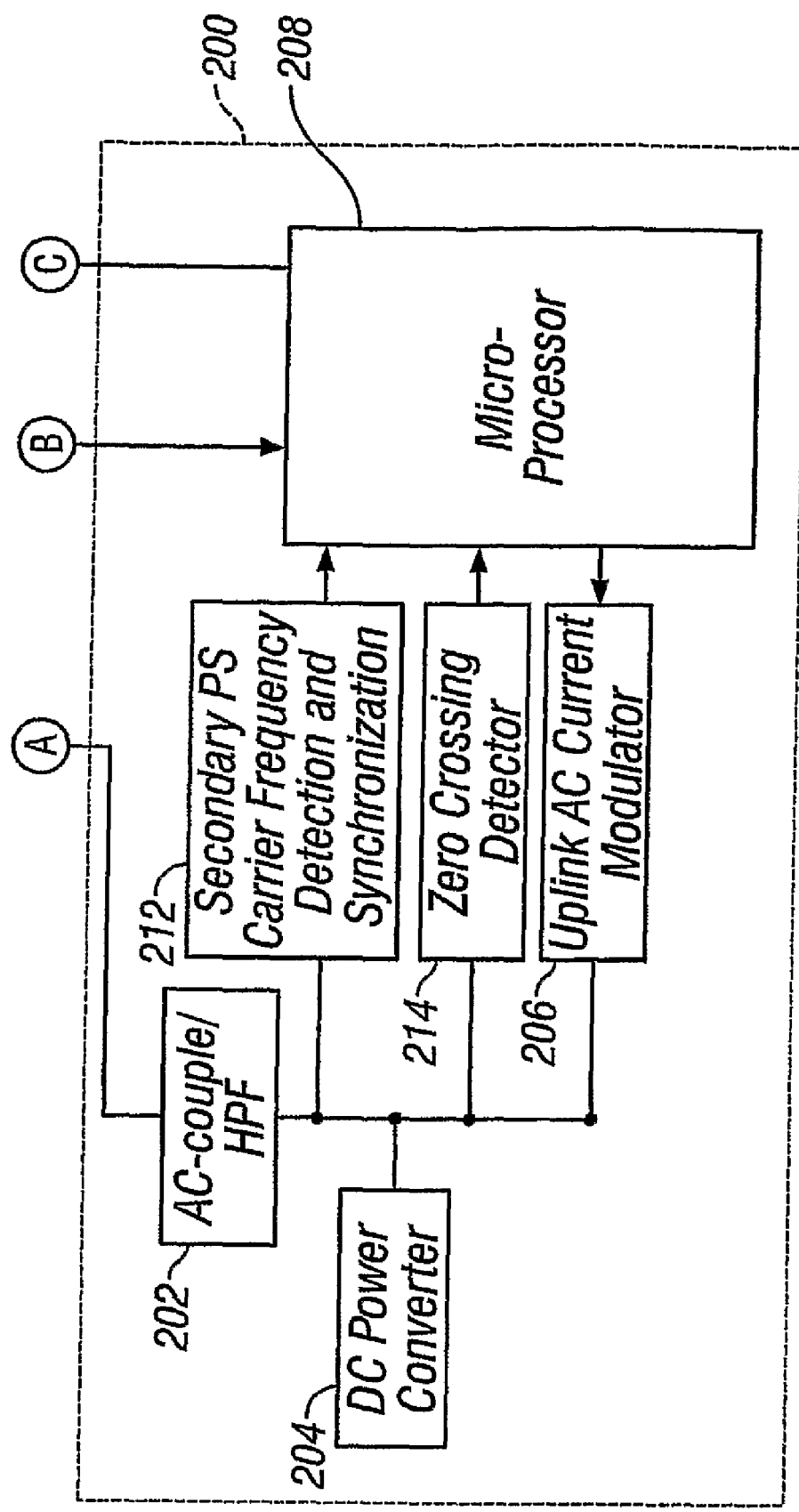

Turning now to FIGS. 1A and 1B, there is shown a functional block diagram of a preferred embodiment of a communication system for use in subterranean borehole applications (referred to as "downhole" applications). Such applications include an electrical submersible pumping system that includes a submersible motor and pump assembly 10 that is located downhole and used to pump fluids and/or gases out of the borehole. A surface-located three-phase power supply 12 provides a three-phase AC power signal (consisting of a Phase 1 AC power signal, Phase 2 AC power signal, and Phase 3 AC power signal) to the submersible motor and pump assembly 10 over a three-conductor power cable 14 as shown. The three-phase power signal is coupled to the ESP motor by a balanced inductor network having a neutral, ungrounded node as is well known. This node is typically referred to as the "wye node" of the ESP motor. The voltage and current levels of the three-phase AC power signal provided by the ESP power supply 12 (and carried by the power cable 14) are typically very large (for example, on the order of 2000 volts and 25 amps) and oscillate at a low frequency such as 60 Hz.

Such downhole applications also include a control and monitoring unit 16 that is located at a surface location in addition to one or more measurement devices 20 that are located at a downhole location. The control and monitoring unit 16 includes a microprocessor 18 that cooperates with a control panel 19 to provide for user input and output. The downhole measurement device(s) 20 typically monitor certain physical parameters (such as temperature and pressure) present in the downhole environment. In such installations, there exists the requirement to communicate telemetry data that represents the physical parameters measured by the downhole measurement device(s) 20 to the surface-located control and monitoring unit 16, and possibly to remotely control certain operational functions of such measurement device(s) 20 by the control and monitoring unit 16.

In accordance with the present invention, communication between the downhole measurement device(s) 20 and the surface-located control and monitoring unit 16 is provided by a surface unit 100 and a downhole unit 200. The surface unit 100 includes three interface circuits 102A, 102B, 102C, each electrically-coupled to a different one of the three conductors of the three-phase power cable 14 as shown. The interface circuits 102A, 102B, 102C each provide AC-coupling such that DC signal variations that exist on the respective conductor coupled thereto are blocked and isolated from passing therethrough. Moreover, the interface circuits 102A, 102B, 102C each provide high pass filtering that filters out unwanted low frequency signal components (including the low frequency three-phase ESP power signal) that exist on the respective conductor of the power cable 14. In this manner, the interface circuits 102A, 102B, 102C protect the components of the surface unit 100 from the ESP power supply voltage levels and current levels carried on the three conductors of the power cable 14. Such levels can be considerable in amplitude.

The surface unit 100 also includes secondary power supply circuitry 103 that generates a secondary AC power supply signal and drive circuits (e.g., amplifiers) 104A, 104B, 104C that communicate the secondary AC power supply signal over the three conductors of the power cable 14. The voltage and current levels of this secondary AC power supply signal are significantly smaller than those of the ESP power supply signal. The high-pass filtering functionality provided by the interface circuits 102A, 102B, 102C passes the secondary AC power supply signal (which is supplied thereto by the signal and drive circuits 104A, 104B, 104C) to the respective conductors of the power cable 14. The up to three conductors of the power cable 14 carry this secondary AC power supply signal to the wye-point of the ESP motor.

On the downhole side, the downhole unit 200 includes an interface circuit 202 that is electrically-coupled to the wye-point of the ESP motor. The interface circuit 202 provides AC-coupling such that DC signal variations that occur at the wye point are blocked and isolated from passing therethrough. Moreover, the interface circuit 202 provides high pass filtering that filters out unwanted low frequency signal components (including those low frequency components that are derived from the three-phase ESP power signal) that exist at the wye point. In this manner, the interface circuit 202 protects the components of the downhole unit from the ESP power supply voltage levels and current levels, which can be considerable in amplitude. Moreover, the high-pass filtering functionality provided by the interface circuit 202 passes the secondary AC power supply signal generated by the secondary power supply circuitry 103 of the surface unit 100 and communicated thereto by the three conductors of the power cable 14.

The downhole unit 200 also includes DC power conversion circuitry 204 that is electrically coupled to the wye point of the ESP motor by the interface circuit 202. The DC power conversion circuitry 204 converts the secondary AC power signal, which exists at the wye point and is passed by the interface circuit 202, into one or more DC power signals suitable for powering other components of the downhole unit 200 (e.g., circuits 204, 206, 208, 212, 214, described below) and possibly the downhole measurement device(s) 20. Because the secondary power supply circuitry 103 of the surface unit 100 operates independently of the ESP power supply 12, power can be supplied to the downhole unit 200 and the downhole measurement device(s) 20 when the ESP power supply 12 is on or off.

The downhole unit 200 also includes a modulator circuit 206 that cooperates with a microprocessor 208 to generate a modulated AC signal that represents a serial digital data stream. The serial digital data stream carries telemetry data that represents the physical parameters measured by the downhole measurement device(s) 20. The microprocessor 208 stores such telemetry data (in digital form) and encodes it as part of a serial digital data stream. Preferably, the serial digital data stream is packetized with each packet having an error detection checksum contained therein. This checksum enables the integrity of the packet to be verified upon reception at the surface control unit 16. The microprocessor 208 controls the modulator circuit 206 to modulate the AC surface supply current to represent the serial digital data stream. The high pass filter functionality of the interface circuit 202 passes the modulated AC signal to the wye point of the motor for communication over the conductors of the power cable 14. In this manner, the modulated AC signal supplied to the wye point provides for uplink communication over the conductors of the power cable 14.

Figure 2B:
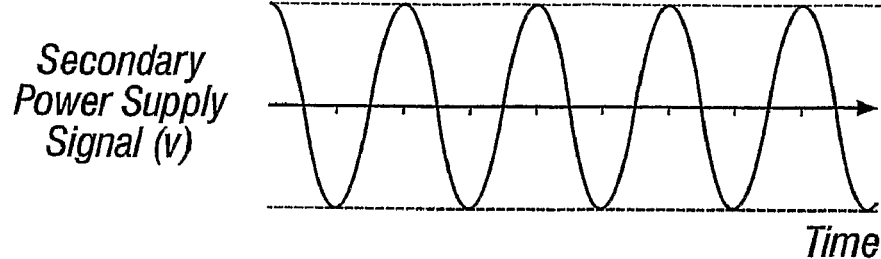
FIGS. 2B(*i*)-(*iii*) illustrate signals utilized for uplink communication from the downhole unit to the surface unit of FIGS. 1A and 1B, wherein the frequency of the secondary power supply carrier is greater than that shown in FIGS. 2A(*i*)-(*iii*)

In the illustrative embodiment shown, the modulator circuit 206 is adapted to vary the amount of current drawn from the wye point of the ESP motor in generating the modulated AC signal that is communicated over the conductors of the power cable 14. Preferably, such current variations are produced at a frequency relative to the frequency of the secondary power supply signal. For example, the frequency of the current variations may be equal to the frequency of the second power supply signal. In this configuration, the current variations may occur at times that are synchronous with zero-crossings in the voltage level of the second power supply signal generated by the secondary power supply circuitry 103 as shown in FIGS. 2A and 2B. Such operations advantageously reduce the inrush currents, thereby decreasing the stress on the components of the downhole unit 200. Note that the relation of the frequency of the secondary power signal to the frequency of the uplink modulated AC signal need not be equal (e.g., 1:1), but can be any arbitrary relation. However, the synchronization of the secondary power signal frequency to the frequency of the uplink modulated AC signal greatly improves the effective signal-to-noise ratio seen at the surface receiver.

Detection of (and synchronization to) the frequency of the secondary power supply signal is provided downhole by frequency detection and synchronization circuitry 212, which is electrically coupled to the wye point of the ESP motor by the interface circuit 202. Zero-crossings in the secondary signal are detected downhole by a zero-crossing detector 214, which is electrically-coupled to the wye point of the ESP motor by the interface circuit 202. The zero-crossing detector 214 generates timing signals that are synchronous to such zero-crossings and supplies these timing signals to the microprocessor 208. The microprocessor 208 cooperates with the frequency detection and synchronization circuitry 212 and the zero-crossing detector 214 to operate the modulator circuit 206 such that the current modulations produced therefrom occur at the same frequency as the secondary power supply signal and occur synchronous to the zero-crossing timing signals as shown in FIGS. 2A and 2B. In addition, the frequency of the uplink modulated AC signal can be either twice the secondary power signal frequency or 1 over N times the secondary power signal frequency. By using N secondary power signal cycles to represent an uplink bit, the effective signal-to-noise ratio is increased.

On the surface, the interface circuits 102A, 102B, 102C pass the modulated AC signal (generated by the modulator circuit 206) carried by the conductors of the power cable 14 to respective demodulator circuits 106A, 106B, 106C that are electrically coupled thereto. The demodulator circuits 106A, 106B, 106C recover the digital data stream from the modulated AC signal supplied thereto by the interface circuits 102A, 102B, 102C, and supply the recovered digital data stream(s) to the microprocessor 18 of the control and monitoring unit 16. The microprocessor 18 decodes the telemetry data from the recovered digital data stream(s). Preferably, such decoding operations verify the error detection checksums of packets that make up the recovered digital data stream. If a checksum verification operation fails, the telemetry data associated therewith is ignored. The telemetry data successfully decoded from the recovered digital data stream is stored in persistent storage and/or output (e.g., displayed) to the user via the control panel 19.

For the illustrative embodiment discussed above where the modulator circuit 206 generates the modulated AC signal by varying the amount of current drawn from the wye point of the ESP motor, the demodulator circuits 106A, 106B, 106C recover the digital data stream by detecting changes in the current signal drawn from the respective conductor of the power cable 14 and passed by the respective interface circuit, and resolving such current changes back into a digital data stream. For configurations where the current modulations produced by the downhole modulator circuit 206 are synchronous with zero-crossings in the voltage level of the second power supply signal generated by the secondary power supply circuitry 103, such zero-crossings are detected at the surface by a zero-crossing detector 110 that is electrically-coupled to the output of the secondary power supply circuitry 103. The detector 110 generates timing signals that are synchronous to such zero-crossings and supplies these timing signals to the microprocessor 18. The microprocessor 18 uses these timing signals to cooperate with the demodulator circuits 106A, 106B, 106C in recovering the telemetry data encoded within the digital data stream represented by the current modulations produced by the downhole modulator circuit 206. In this manner, the downhole processor automatically synchronizes to the secondary power signal generated at the surface. This method is used to improve the signal-to-noise ratio by moving the uplink signal to a less noisy frequency.

In the illustrative embodiment discussed above, the frequency of the secondary power supply signal generated by the secondary power supply circuitry 103 and drive circuits 104A, 104B, 104C may be varied in accordance with a control signal supplied thereto by the microprocessor 18. On the downhole side, the frequency detection and synchronization circuitry 212 detects and synchronizes to the frequency of the secondary power supply signal (which exists at the wye point and is passed by the interface circuit 202), and supplies a timing signal that represents the detected frequency to the microprocessor 208. The dynamic nature of the frequency of the secondary power supply signal can be used in three ways.

First, the dynamic nature of the frequency of the secondary power supply signal can be used to adapt the uplink carrier frequency to improve performance by moving from noisy frequency bands and increasing the signal-to-noise ratio. Such dynamic frequency adjustment can be accomplished without a downlink channel. For example, consider the scenario where a voltage spike of higher frequency occurs in the output of the three-phase ESP power supply 12 (possibly caused by harmonics) and such higher frequency noise coexists at the selected communications frequency for the secondary power supply signal. In this case, the microprocessor 18 may be adapted to automatically select another communications frequency and vary the carrier frequency of the secondary power supply signal accordingly with control signals supplied to the secondary power supply circuitry 103. On the downhole side, the frequency detection and synchronization circuitry 212 (and possibly the zero-crossing detector 214) synchronize to this updated carrier frequency, and cooperate with the microprocessor 208 to provide for uplink communication at a frequency relative to the secondary power supply signal.

Second, the dynamic nature of the frequency of the secondary power supply signal can be used to address different measurement devices (or multiple sets of measurement devices). More specifically, the frequency range of the secondary power supply signal is partitioned into discrete sub-ranges that are assigned to different downhole measurement devices (or different sets of downhole measurement devices). In this configuration, the frequency detection and synchronization circuitry 212 detects and synchronizes to the frequency of the secondary power supply signal. Based upon these operations, the microprocessor 208 accesses the telemetry data of the downhole measurement device (or the set of downhole measurement devices) corresponding to the detected frequency, and constructs the digital data stream using such telemetry data. In this manner, the modulated AC signal generated by the downhole modulator circuit 206 communicates the telemetry data for the downhole measurement device (or the set of downhole measurement devices) in conjunction with the secondary power supply signal whose frequency corresponds to the downhole measurement device (or the set of downhole measurement devices). For example, FIG. 2A illustrates uplink communication in conjunction with a secondary power supply signal whose frequency $f_1$ corresponds to a first measurement device (e.g., tool no. 1), while FIG. 2B illustrates uplink communication in conjunction with a secondary power supply signal whose frequency $f_2$ corresponds to a second measurement device (e.g., tool no. 2). As is evident, the frequency $f_2$ corresponding to the second measurement device is higher than the frequency $f_1$ corresponding to the second measurement device. However, both tools could remain powered by the secondary power supply signal.

Figure 3:
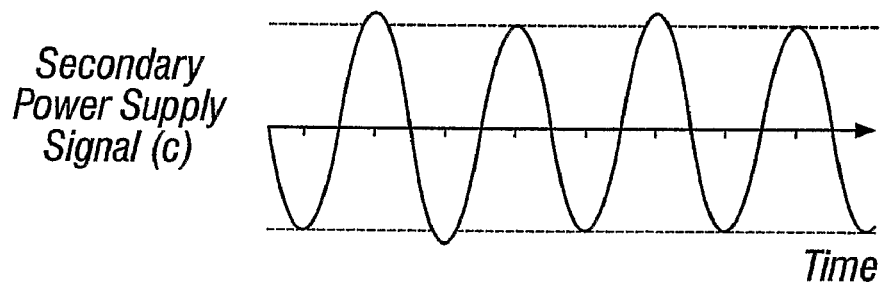
FIG. 3 is a representation of a voltage waveform of the ESP power supply signal generated by the surface-located ESP power supply of FIG. 1A, which illustrates the higher frequency secondary power supply signal superimposed onto the ESP power supply signal.
Figure 3:
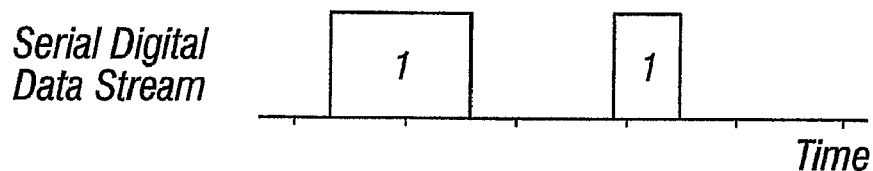
Figure 3:
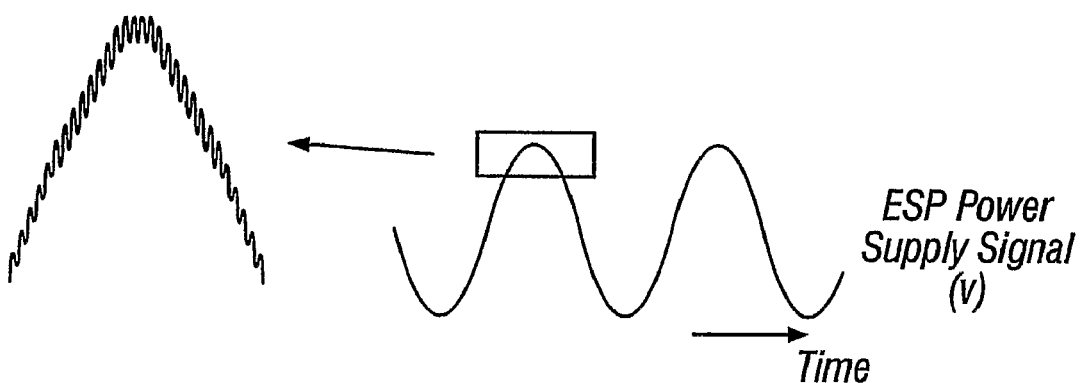

Third, the dynamic nature of the frequency of the secondary power supply signal can be used to support downlink communication from the surface-located control and monitoring unit 16 to the downhole-located measurement device(s) 20. In this configuration, the microprocessor 18 will vary the frequency of the secondary power supply signal generated by the secondary power supply circuitry 103 using well known frequency shift keying techniques. For example, one frequency may represent a "0", while another frequency may represent a "1". In this manner, the frequency variations of the secondary power supply signal represent a serial digital data stream produced by the microprocessor 18. Preferably, this serial digital data stream is packetized with each packet having an error detection checksum contained therein. This checksum enables the integrity of the packet to be verified upon reception at the downhole unit 200. For downlink communication, the serial digital data stream represents command data that effectuates remote control of the downhole measurement device(s) 20. As shown in FIG. 3, the secondary power supply signal (and its frequency variations) is superimposed onto the lower-frequency ESP power supply signal waveform that is carried over the conductors of the power cable 14. On the downhole side, the frequency detection and synchronization circuitry 212 and microprocessor 208 cooperate to recover the serial digital data stream represented by the frequency variations in the secondary power supply signal. The microprocessor 208 decodes the command data from the recovered digital data stream. Preferably, such decoding operations verify the error detection checksums of packets that make up the recovered digital data stream. If a checksum verification operation fails, the command data associated therewith is ignored. The microprocessor 208 utilizes the command data successfully decoded from the recovered digital data stream to controls the appropriate downhole device in accordance with such command data.

Figure 4:
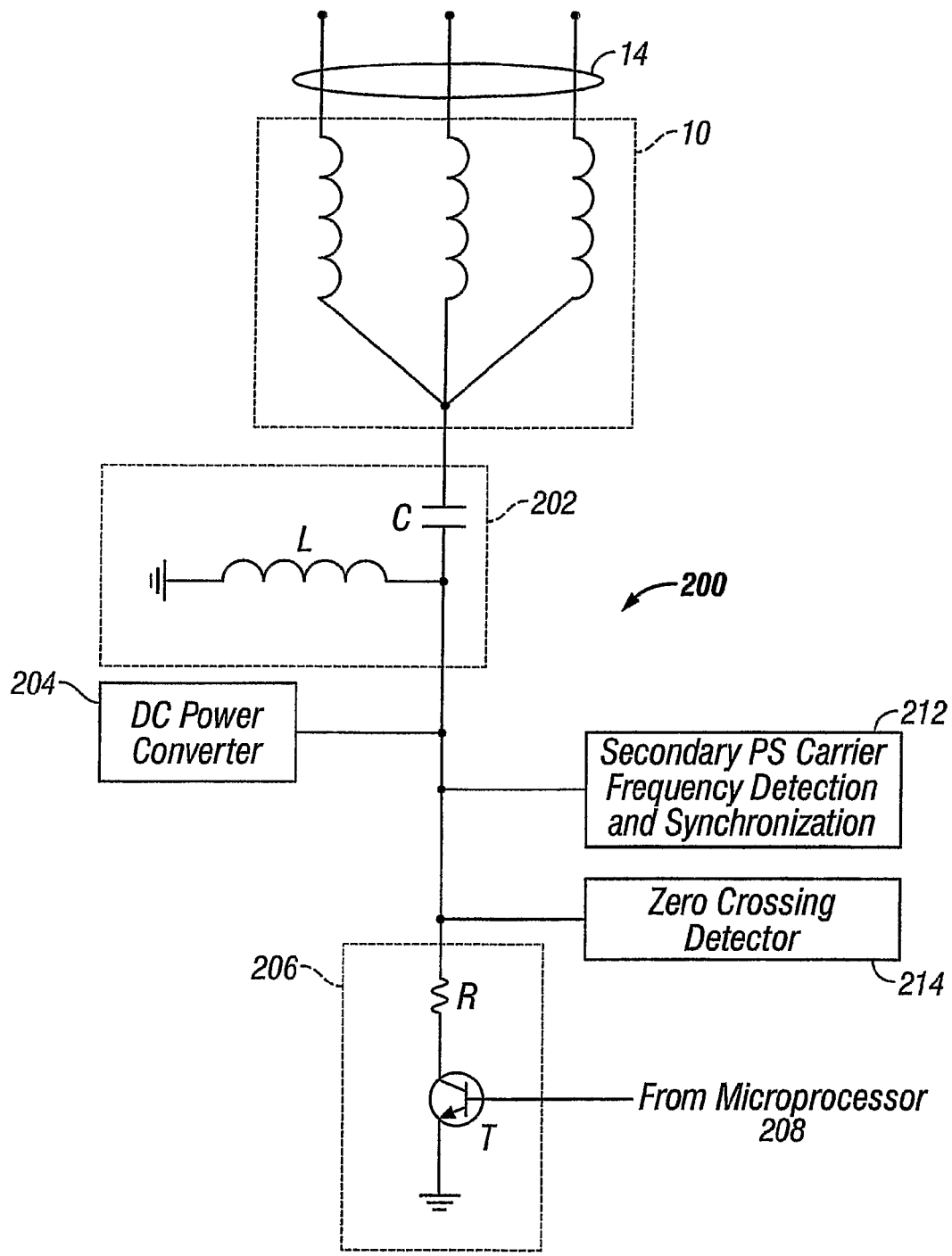
FIG. 4 is schematic diagram illustrating the ESP motor and its wye point and exemplary embodiments of components of the downhole unit of FIGS. 1A and 1B.

As shown in FIG. 4, the interface circuit 202 of the downhole unit 200 may be realized by an AC coupling capacitor C that provides for DC signal isolation between the wye point of the ESP motor and components of the downhole unit 200 as shown. In addition, the capacitor C cooperates with a signal path that passes through an inductor L to ground potential to provide the desired high pass filter functionality described above. The interface circuitry 102A, 102B, 102C of the surface unit 100 may be realized by similar circuit elements. However, other AC coupling methods, such as inductive coupling, may also be utilized.

FIG. 4 also shows a realization of the downhole modulator circuit 206. In this exemplary embodiment, a transistor T, which may be a bipolar transistor or a field-effect transistor, is modulated between a conducting "on" state and non-conducting "off" state to vary the current drawn from the wye point of the ESP motor via the interface circuit 202. Such modulating current provides the uplink communication of telemetry data to the control and monitoring unit 16 as described above. Of course, other techniques may also be used to modulate the current of the AC signal generated by the surface equipment.

It should be noted that the surface unit 100 includes three separate signal processing channels (one for each conductor of the power cable 14) for communication of data between the surface unit 100 and the downhole unit 200. Such functionality is redundant during normal operation; however, it advantageously provides some ground fault protection to the system. More specifically, it is common for the ESP power cable 14 to develop a fault that provides a current leakage path to ground on one of the power conductors. If such a fault occurs, any current carried by the faulty conductor (including current that is part of the primary ESP AC power signal, the secondary AC power supply signal, and current variations that are superimposed onto the secondary AC power supply signal) will go to ground through the ground fault. The redundant 3-channel architecture of the surface unit 100 allows communication to continue in the presence of such a ground fault because the necessary signals (including the secondary AC power supply signal and current variations that are superimposed onto the secondary AC power supply signal) are communicated between the surface unit 100 and the downhole unit 200 over the other "good" conductors of the power cable 14. Note that some current carried over the "good" conductors of the power cable 14 will be lost to the ground fault (by flowing through the motor windings and into the faulty conductor). However, because the impedance of the motor windings is non-zero (typically hundreds of ohms or more), the current that flows through the motor windings will be limited, and some of the necessary signals will be passed between the surface unit 100 and the downhole unit 200. In this manner, the data communication system of the present invention maintains communication in the event of a ground fault on the power cable. Many prior art systems are rendered inoperable under such conditions.

Moreover, the data communication system of the present invention is cost-effective because the downhole interface to the conductors of the power cable is through the wye point of ESP motor; thus, significant modification of the power cable or the electrical submersible pump is avoided.

In addition, the data communication system of the present invention uses the ESP power cable to carry data communication signals as well as secondary power supply signals (which power the downhole communication unit and possibly the measurement devices). This feature allows the downhole communication unit and downhole measurement devices to operate when the ESP power is on or off.

The data communication system of the present invention also avoids the use of large isolation chokes, and thus provides for a substantial increase in the data communication rate and thus the amount of data communicated between the surface and the downhole environment.

Finally, the data communication system of the present invention may utilize frequency-based channel hopping and/or digital error detection techniques to further enhance the reliability of communications in noisy environments.

A data communication system and corresponding method of operation has been described for use in downhole applications. All communication between the surface and downhole environment is accomplished through the power cable, which carries AC power to the downhole environment without the use of additional communication lines. It will be readily appreciated that the principles of the present invention are applicable to other applications in which an AC powered device is remotely located and in which it is desired to supply power to the remote site, monitor certain parameters at the remote site, and possibly control operational functions at the remote site.

There have been described and illustrated herein several embodiments of a data communication system for downhole applications. While particular embodiments of the invention have been described, it is not intended that the invention be limited thereto, as it is intended that the invention be as broad in scope as the art will allow and that the specification be read likewise. Thus, while particular modulation schemes have been disclosed for both uplink communication and downlink communication, it will be appreciated that other modulation schemes can be used as well. Furthermore, while a three-channel signal processing architecture is employed at the surface unit, it will be understood that other architectures can be similarly used. Moreover, while particular interface configurations have been disclosed in coupling to the ESP power conductors, it will be appreciated that other configurations could be used as well. It will therefore be appreciated by those skilled in the art that yet other modifications could be made to the provided invention the scope of the invention as claimed.

What is claimed is:

1. A data communication system for use in applications wherein electrical energy is supplied to a motor assembly over power conductors that carry an AC power signal, the motor assembly having an inductor network that is coupled to the power conductors and that has a neutral ungrounded node, the data communication system comprising:
 a data transmission subsystem, said data transmission subsystem generating a modulated AC uplink signal; and
 an interface circuit comprising a capacitor, operably coupled between the data transmission subsystem and the node, that provides high pass filtering that passes the modulated AC uplink signal generated by the data transmission subsystem to the node for data communication over the power conductors to an assembly positioned at a remote location.

2. A data communication system according to claim 1, wherein: said high pass filtering provided by said interface circuit provides filtering of unwanted low frequency signals that include components of said AC power signal.

3. A data communication system according to claim 2, wherein: said modulated AC uplink signal represents a digital data stream.

4. A data communication system according to claim 3, wherein: said digital data stream carries telemetry data sensed by at least one measurement device.

5. A data communication system according to claim 3, wherein: said modulated AC uplink signal comprises a modulated AC current signal.

6. A data communication system according to claim 5, wherein: said data transmission subsystem comprises a transistor that is modulated between its conducting state and non-conducting state in accordance with said digital data stream to vary an amount of current drawn from the node to thereby provide said modulated AC current signal.

7. A data communication system according to claim 1, wherein: said high pass filtering provided by said interface circuit passes a secondary AC power signal that exists at the node.

8. A data communication system according to claim 7, wherein: said secondary AC power signal has a first characteristic frequency, and said data transmission subsystem is adapted to generate said modulated AC uplink signal at a second characteristic frequency relative to said first characteristic frequency.

9. A data communication system according to claim 8, wherein: said second characteristic frequency is equal to said first characteristic frequency.

10. A data communication system according to claim 9, wherein: said data transmission subsystem further comprises zero-crossing detection circuitry, operably coupled to the node by said interface circuit, that detects zero-crossings in the secondary AC power signal, and said data transmission subsystem is adapted to transmit said modulated AC uplink signal in a synchronous manner with said zero-crossings detected by said zero-crossing detection circuitry.

11. A data communication system according to claim 7, further comprising: power conversion circuitry, operably coupled to the node by said interface circuit, that converts said secondary AC power signal supplied thereto into at least one DC power signal.

12. A data communication system according to claim 11, wherein: said at least one DC power signal generated by said power conversion circuitry is supplied to components of said data transmission subsystem.

13. A data communication system according to claim 1, wherein:
 said remote assembly includes
  i) a first data receiver subsystem,
  ii) a first remote interface circuit, operably coupled between a first one of the power conductors and said first data receiver subsystem, that provides high pass filtering that passes said modulated AC uplink signal transmitted by said data transmission subsystem,
  iii) a second data receiver subsystem,
  iv) a second remote interface circuit, operably coupled between a second one of the power conductors and said second data receiver subsystem, that provides high pass filtering that passes said modulated AC uplink signal transmitted by said data transmission subsystem,
  v) a third data receiver subsystem, and
  vi) a third remote interface circuit, operably coupled between a third one of the power conductors and said third data receiver subsystem, that provides high pass filtering that passes said modulated AC uplink signal transmitted by said data transmission subsystem;
  wherein said first, second and third data receiver subsystems receive said modulated AC uplink signal transmitted by said data transmission subsystem and communicated over the power conductors.

14. A data communication system according to claim 13, wherein: said first, second and third remote interface circuits provide filtering of unwanted low frequency signals that include components of said AC power signal.

15. A data communication system according to claim 13, wherein: said remote assembly further includes
 vii) a power supply signal generator that generates a secondary AC power signal;
 viii) a first drive circuit, operably coupled to said first remote interface circuit, that supplies said secondary AC power signal for transmission over the first one of the power conductors,
 ix) a second drive circuit, operably coupled to said second remote interface circuit, that supplies said secondary AC power signal for transmission over the second one of the power conductors, and
 x) a third drive circuit, operably coupled to said third remote interface circuit, that supplies said secondary AC power signal for transmission over the third one of the power conductors.

16. A data communication system according to claim 15, further comprising:
 power conversion circuitry that converts said secondary AC power signal supplied thereto into at least one DC power signal.

17. A data communication system according to claim 16, wherein: said at least one DC power signal generated by said power conversion circuitry is supplied to components of said data transmission subsystem and at least one measurement device.

18. A data communication system according to claim 15, wherein: said power supply signal generator varies the frequency of said secondary AC power signal, and said data transmission subsystem is adapted to generate said modulated AC uplink signal at a frequency different from that of said secondary AC power signal.

19. A data communication system according to claim 18, wherein: the frequency of said secondary AC power signal is dynamically varied to minimize noise for communication to the remote assembly.

20. A data communication system according to claim 18, wherein: frequencies of said secondary AC power signal are assigned to a different measurement devices, and the frequency of said secondary AC power signal is dynamically varied to provide uplink communication of telemetry data for different measurement devices.

21. A data communication system according to claim 18, wherein: the frequency of said secondary AC power signal is dynamically varied to provide downlink communication of command data over the power conductors for remote control of one or more measurement devices.

22. A data communication system according to claim 21, further comprising: a fourth data receiver subsystem operably coupled to the node, that receives said secondary AC power signal communicated over the power conductors, converts frequency variations therein to recover a digital data stream represented by said frequency variations, and decodes the recovered digital data stream to identify command data contained therein.

23. A data communication system according to claim 22, further comprising:
control means, operably coupled to said fourth data receiver subsystem, for controlling at least one measurement device in accordance with said command data identified by said fourth data receiver subsystem.

24. A data communication system for use in downhole applications wherein a lower-frequency power supply signal is supplied from a surface location to a downhole motor assembly over a cable having multiple conductors, the downhole motor assembly having an inductor network that is coupled to the multiple conductors of the cable and that has a neutral, ungrounded node, the data communication system comprising:
a downhole communication subsystem operably coupled to at least one downhole measurement device, said downhole communication subsystem comprising a capacitor and being AC-coupled to the neutral, ungrounded node of the downhole motor assembly;
a surface communication subsystem that is AC-coupled to the multiple conductors of the cable;
wherein said downhole communication subsystem and said surface communication subsystem support an AC communication scheme for uplink communication of telemetry data derived from the output of the at least one downhole measurement device.

25. A data communication system according to claim 24, wherein: said AC communication scheme for uplink communication employs current modulation of a higher-frequency power supply carrier signal.

26. A data communication system according to claim 25, further comprising:
downhole power conversion circuitry that converts said higher-frequency power supply carrier signal to at least one DC power signal for powering components of said downhole communication subsystem and/or said at least one downhole measurement device.

27. A data communication system according to claim 24, wherein: said downhole communication subsystem and said surface communication subsystem support an AC communication scheme for downlink communication of command data for remote control of the at least one downhole measurement device.

28. A data communication system according to claim 27, wherein: said AC communication scheme for downlink communication employs frequency modulation of a higher-frequency power supply carrier signal.

29. A data communication system according to claim 28, further comprising:
downhole power conversion circuitry that converts said higher-frequency power supply carrier signal to at least one DC power signal for powering components of said downhole communication subsystem and/or said at least one downhole measurement device.

30. A data communication system according to claim 24, wherein: said surface communication subsystem comprises multiple signal processing channels corresponding to the multiple conductors of the cable to provide for continued communication in the presence of a ground fault on the multiple conductors.

* * * * *